(12) United States Patent
Kawamura

(10) Patent No.: US 12,055,736 B2
(45) Date of Patent: Aug. 6, 2024

(54) MIRROR FOR CAMERA SYSTEM AND CAMERA SYSTEM

(71) Applicant: JVCKENWOOD Corporation, Yokohama (JP)

(72) Inventor: Ken Kawamura, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 140 days.

(21) Appl. No.: 17/955,207

(22) Filed: Sep. 28, 2022

(65) Prior Publication Data

US 2023/0015766 A1 Jan. 19, 2023

Related U.S. Application Data

(63) Continuation of application No. PCT/JP2021/044476, filed on Dec. 3, 2021.

(30) Foreign Application Priority Data

Jun. 28, 2021 (JP) .................................. 2021-106833

(51) Int. Cl.
*G02B 5/08* (2006.01)
*B60R 1/04* (2006.01)
*B60R 1/12* (2006.01)
*G02B 5/20* (2006.01)
*G02B 5/26* (2006.01)
*G03B 11/00* (2021.01)
*H04N 23/55* (2023.01)
*H04N 23/56* (2023.01)

(52) U.S. Cl.
CPC ........... *G02B 5/0808* (2013.01); *G02B 5/208* (2013.01); *G02B 5/26* (2013.01); *G03B 11/00* (2013.01); *H04N 23/56* (2023.01); *B60R 1/04* (2013.01); *B60R 1/12* (2013.01); *G02B 2207/113* (2013.01)

(58) Field of Classification Search
None
See application file for complete search history.

(56) References Cited

U.S. PATENT DOCUMENTS

2009/0040778 A1* 2/2009 Takayanagi ............... B60R 1/26
362/494

FOREIGN PATENT DOCUMENTS

JP 2002316580 A 10/2002
JP 2008290545 A 12/2008

* cited by examiner

*Primary Examiner* — Christopher Braniff
(74) *Attorney, Agent, or Firm* — Procopio, Cory, Hargreaves & Savitch LLP

(57) ABSTRACT

A mirror for camera system includes a substrate, a mirror layer, a fluorescent layer and an excitation window layer. The substrate is provided at a position opposed to an objective lens of an infrared camera, and transmits visible light and infrared light. The mirror layer is provided on a main surface of the substrate, which is the side opposed to the infrared camera, and reflects visible light and transmits infrared light. The fluorescent layer is provided in at least a part of the surface of the mirror layer, and emits at least infrared light as a result of receiving predetermined excitation light. The excitation window layer is provided so as to cover the fluorescent layer, and transmits the excitation light and reflects, at least, the infrared light.

5 Claims, 4 Drawing Sheets

MIRROR FOR CAMERA SYSTEM AND CAMERA SYSTEM

CROSS REFERENCE TO RELATED APPLICATION

The present application is based upon and claims the benefit of priority from Japanese Patent Application No. 2021-106833, filed on Jun. 28, 2021, the disclosure of which are incorporated herein in its entirety by reference.

BACKGROUND

The present invention relates to a mirror for camera system, and a camera system.

There have been developed camera systems in which an infrared camera is built in behind a mirror.

For example, in Japanese Unexamined Patent Application Publication No. 2008-290545, a technology relating to an in-cabin image pickup apparatus is disclosed. The in-cabin image pickup apparatus detects an angle of a mirror surface of a room mirror with respect to the vehicle, and estimates a position of the head of an occupant in the cabin based on the detection result of an angle sensor. Then, based on the estimation result, the in-cabin image pickup apparatus changes an image pickup direction of the camera with respect to the mirror surface such that the head of the occupant is disposed on the optical axis of the camera.

Moreover, for example, in Japanese Unexamined Patent Application Publication No. 2002-316580, a technology relating to a mirror apparatus with built-in camera has been disclosed, in which an infrared camera, an infrared light emitting apparatus, and a shutter-synchronous light emission driving apparatus are arranged in a mirror case at the back of a cold mirror. In the mirror apparatus with built-in camera, the infrared light emitting apparatus is caused to perform intermittent light emitting operation synchronously with the shutter operation of the infrared camera by the shutter-synchronous light emission driving apparatus.

SUMMARY

However, in an infrared ray light emitting element which is used as the light source in the above-described technologies, changes in the wavelength of light, which occur by being affected by changes in environmental temperature, are likely to occur. For this reason, the quality of the image picked up by the infrared camera may become unstable.

The present disclosure has been made to solve the above-described problem and provides a mirror for camera system, and a camera system, which suppress variations in image quality.

A mirror for camera system relating to the present embodiment includes a substrate, a mirror layer, a fluorescent layer and an excitation window layer. The substrate is provided at a position opposed to an objective lens of an infrared camera, and transmits visible light and infrared light. The mirror layer is provided on a main surface side of the substrate, which is the side opposed to the infrared camera, and reflects visible light and transmits infrared light. The fluorescent layer is provided in at least a part of the surface of the mirror layer, and emits at least infrared light as a result of receiving predetermined excitation light. The excitation window layer is provided so as to cover the fluorescent layer and transmits the excitation light, and reflects, at least, the infrared light.

According to the present embodiment, it is possible to provide a mirror for camera system and a camera system, which suppress variations in image quality.

DETAILED DESCRIPTION

Figure 1:
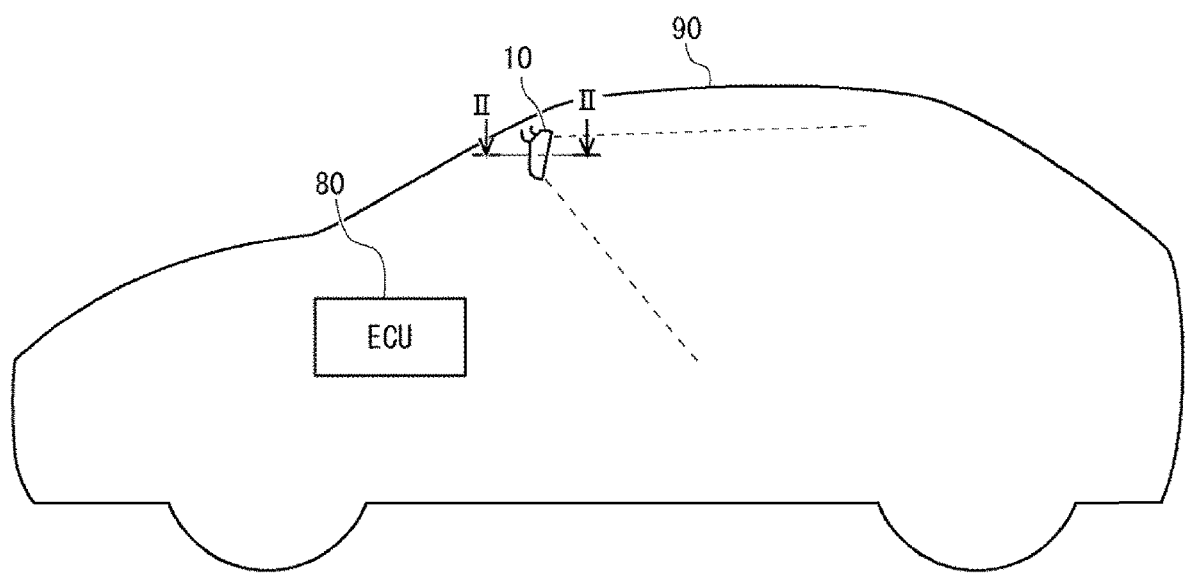
FIG. 1 is a diagram to show a moving body equipped with a camera system according to an embodiment.

Hereinafter, the present invention will be described through embodiments of the invention, but the invention according to the claims is not limited to the following embodiments. Further, not all of the configurations described in the embodiments are essential as means for solving problems. For clarification of explanation, the following descriptions and drawings have been omitted, and simplified as appropriate. In each drawing, like elements are given the same reference numerals, and duplicate descriptions are omitted as necessary.

Embodiments

Hereinafter, an embodiment of the present invention will be described with reference to the drawings. FIG. 1 is a diagram to show a moving body with a camera system according to the embodiment. FIG. 1 shows an automobile 90 as an aspect of the moving body. The automobile 90 includes a camera system 10 and an ECU (Electronic Control Unit) 80.

The camera system 10 is provided on the interior side of a windshield of the automobile 90 and functions as an inner mirror. The inner mirror may also be referred to as a back mirror or a rear view mirror.

Moreover, the camera system 10 picks up an image of the interior of the automobile 90 from the installed position. More specifically, the camera system 10 illuminates the interior with a light emitting unit that emits infrared light having a predetermined wavelength, and picks up an image of the interior with an infrared camera.

Further, the camera system 10 can realize a predetermined function by being communicably connected with the ECU 80 and cooperating with the ECU 80. For example, upon receiving a signal that instructs image picking-up, from the ECU 80, the camera system 10 picks up an image of the interior according to the received signal and supplies image data generated by the image picking-up, to the ECU 80.

The ECU 80 is a control apparatus provided in the automobile 90, and includes an electronic circuit board including an operation unit such as a CPU (Central Processing Unit). The ECU 80 is communicably connected with the camera system 10, and supplies a signal to give a predetermined instruction to the camera system 10. Moreover, the ECU 80 acquires image data relating to the image picked up by the camera system 10. That is, the ECU 80 can operate the camera system 10.

Moreover, the ECU 80 may be communicably connected with other instruments included in the automobile 90. For example, the ECU 80 may be connected to a display apparatus, and supplies image data received from the camera system 10 to the display apparatus. The ECU 80 may have a wireless communication function. In this case, the ECU 80 may cooperate with an external instrument through the wireless communication function to operate the camera system 10. Note that the above-described camera system 10 and the ECU 80 may be collectively referred to a camera system 10.

Figure 2:
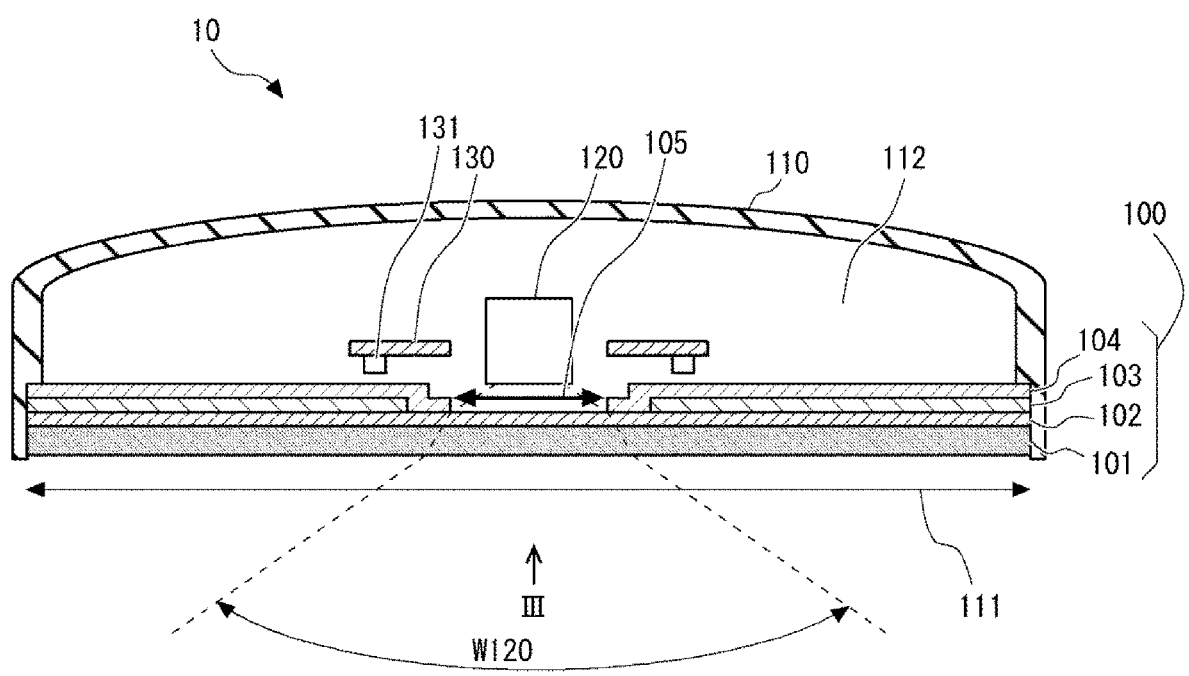
FIG. 2 is a sectional diagram of an infrared camera system according to an embodiment.

Next, the camera system 10 will be described with reference to FIG. 2. FIG. 2 is a sectional diagram of the camera system according to an embodiment. FIG. 2 shows a section II-II shown in FIG. 1. The camera system 10 includes, as main components, a mirror for camera system 100, an enclosure 110, an infrared camera 120, and a light source block 130.

The mirror for camera system 100 is a plate-like member and fits with the enclosure 110 so as to block an opening portion 111 of the enclosure 110. Moreover, the mirror for camera system 100 is provided at a position opposed to the infrared camera 120 and a light emitting unit 131. The mirror for camera system 100 receives excitation light emitted by the light emitting unit 131 accommodated in the enclosure 110 and emits infrared light to the outside. Further, the mirror for camera system 100 transmits infrared light in a predetermined region. Due to the mirror for camera system 100 transmitting infrared light, the infrared camera 120 accommodated in the enclosure 110 can pick up images of the outside. The mirror for camera system 100 includes, as main components, a substrate 101, a mirror layer 102, a fluorescent layer 103, and an excitation window layer 104.

The substrate 101 is provided at a position opposed to the infrared camera 120. The substrate 101 is a transparent, plate-like structure, and transmits at least visible light and infrared light. The substrate 101 may be made of, for example, transparent glass, acrylic, or polycarbonate.

The mirror layer 102 is provided on the main surface of the substrate 101 on the side opposed to the infrared camera 120, and reflects visible light and transmits infrared light. In other words, the mirror layer 102 is provided on the main surface of the substrate 101 on the side opposed to the infrared camera 120, and reflects visible light and transmits infrared light. That is, the mirror layer 102 can adopt a so-called cold mirror.

The mirror layer 102 is provided on the main surface in the mirror for camera system 100 on the side opposed to the infrared camera 120, and reflects visible light and transmits infrared light.

The fluorescent layer 103 is provided in at least a part of the surface of the mirror layer 102, and emits infrared light by receiving predetermined excitation light. The predetermined excitation light is light emitted by the light emitting unit 131 and has a wavelength in a 400 nm band, for example.

The fluorescent layer 103 can be constructed by, for example, forming a film by sputtering a fluorescent body on the surface of the mirror layer 102. Further, the fluorescent layer 103 may be constructed by adding a fluorescent body to a film base material having translucency, for example. As the main raw material for the fluorescent body, rare earth elements can be adopted. More specifically, among rare earth elements, Sm (samarium) can be selected. That is, the fluorescent layer 103 preferably contains samarium doped glass ($Sm_2O_3$—$Sb_2O_3$—$B_2O_3$—$Bi_2O_3$) as the component.

The fluorescent layer 103 exhibits fluorescent light having a wavelength band of an infrared region upon receiving excitation light in the 400 nm band. Note that the fluorescent light exhibited by the fluorescent layer 103 is preferably in a 940 nm band. The 940 nm band has a relatively large attenuation rate of sunlight. For that reason, by using the 940 nm band as the illumination light of the infrared camera 120, the camera system 10 becomes less susceptible to sunlight.

Note that the fluorescent light exhibited by the rare earth elements is caused by transitions of unpaired electron in the inner $4f$ orbitals. Therefore, the fluorescent light of the fluorescent layer 103 is less susceptible to environmental temperature, compared with the light emission by an LED (light-emitting diode). Therefore, by using the mirror for camera system 100 which includes the fluorescent layer 103, the camera system 10 can suppress wavelength shift of infrared light due to change of environmental temperature.

Note that upon receiving excitation light in the 400 nm band, the fluorescent layer 103 also exhibits fluorescence of a wavelength band of visible light region in addition to fluorescence in the above-described 940 nm band. For example, the above-described samarium doped glass has a property of releasing orange visible light as well upon receiving excitation light in the 400 nm band. However, the fluorescent layer 103 is provided on the surface of the mirror layer 102. For that reason, visible light released by the fluorescent layer 103 will not be leaked to the outside of the camera system 10.

The excitation window layer 104 is provided so as to cover the fluorescent layer 103, and transmits the excitation light and reflects at least infrared light. To be more specific, the excitation window layer 104 preferably transmits light having a wavelength in the 400 nm band, and reflects light having a wavelength relatively longer than the 400 nm band. That is, the excitation window layer 104 is preferably a low-pass filter. Due to this, the excitation window layer 104 reflects visible light and infrared light included in the fluorescent light exhibited by the fluorescent layer 103, thereby preventing them from being released inside the camera system 10. The excitation window layer 104 can be constructed by, for example, vapor depositing a dielectric multi-layer film on the surface of the fluorescent layer 103.

Note that the above-described fluorescent layer 103 and the excitation window layer 104 have an opening region 105. The opening region 105 is a region where the fluorescent layer 103 and the excitation window layer 104 are not provided in the mirror for camera system 100. The opening region 105 is provided in a range corresponding to an image pickup range of the infrared camera 120.

In FIG. 2, the opening region 105 is shown in a region where the infrared camera 120 and the mirror for camera system 100 are opposed to each other. The opening region 105 is a region where the fluorescent layer 103 and the excitation window layer 104 are not provided. That is, the mirror for camera system 100 reflects visible light and transmits infrared light, in the opening region 105. In FIG. 2, a dotted line which is shown to radially extend from the infrared camera 120 to the outside of the camera system 10 indicates an image pickup range W120 of the infrared camera 120. The opening region 105 is constructed to correspond to the image pickup range W120, and configured such that the fluorescent layer 103 and the excitation window layer 104 do not overlap in the image pickup range W120.

Figure 3:
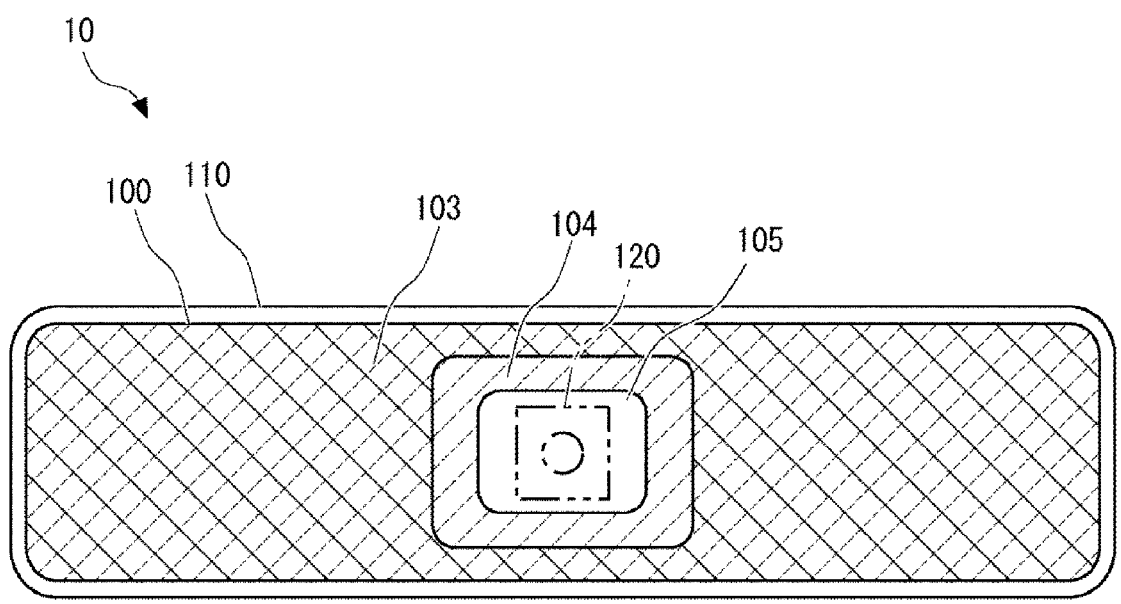
FIG. 3 is a diagram to show a mirror for camera system seen from inside the cabin.

Referring to FIG. 3, the opening region 105 will be further described. FIG. 3 is a diagram of the mirror for camera system seen from inside the cabin. FIG. 3 is a view of the camera system 10 observed from arrow III shown in FIG. 2. In FIG. 3, the mirror for camera system 100 is covered by the enclosure 110. The infrared camera 120 is shown by a two-dot chain line in a central part of the mirror for camera system 100. The infrared camera 120 is provided at the back of the mirror for camera system 100.

An unhatched region, which is shown in such a way to surround the infrared camera 120, indicates the opening region 105. In this region, while the substrate 101 and the mirror layer 102 are provided, the fluorescent layer 103 and the excitation window layer 104 are not provided. A region which is hatched only with dotted lines in such a way to surround the opening region 105, is a region where the excitation window layer 104 is provided. In this region, the fluorescent layer 103 is not provided.

A hatching region which is shown in such a way to surround the hatching only by dotted lines, and where dotted lines and solid lines intersect, is a region where the excitation window layer 104 and the fluorescent layer 103 are provided. As seen when observed in conjunction with FIG. 2, the excitation window layer 104 is constructed so as to cover the fluorescent layer 103. With such configuration, the mirror for camera system 100 causes infrared light to suitably be entered, from the outside, into the image pickup range of the infrared camera 120 via the opening region 105, while preventing other light rays from leaking into the infrared camera 120 as stray light.

Referring back to FIG. 2, description will be continued on the configuration of the camera system 10. The enclosure 110 is a housing formed by shaping a resin material that will not transmit, for example, visible light and infrared light, and includes the opening portion 111 and a recessed portion 112. The recessed portion 112 accommodates the infrared camera 120 and the light emitting unit 131. Moreover, the enclosure 110 fits with the mirror for camera system 100 at the opening portion 111. As a result of the enclosure 110 and the mirror for camera system 100 fitting together, the camera system 10 prevents leakage light other than desired light rays from entering into the infrared camera 120 which is accommodated in the recessed portion 112. The enclosure 110 may be made of metal such as aluminum, in place of the above-described resin.

The infrared camera 120 is an image pickup apparatus including infrared sensors which are arranged in an array, and detect predetermined infrared light. The infrared camera 120 has an objective lens opposed to the mirror for camera system 100, and picks up images of the outside of the camera system 10 via the opening region 105 of the mirror for camera system 100.

Note that although the infrared camera 120 in the present embodiment is provided so as to be opposed to the central part of the mirror for camera system 100, the position where the infrared camera 120 is disposed will not be limited to the central part of the mirror for camera system 100. The infrared camera 120 may be disposed in a region near an end of the mirror for camera system 100. Moreover, the infrared camera 120 does not necessarily has an optical axis orthogonal to the mirror for camera system 100, and the optical axis may have a predetermined angle with respect to the mirror for camera system 100.

The camera system 10 may include two or more infrared cameras 120 in the enclosure 110. In such a case, the mirror for camera system 100 may have a plurality of opening regions 105 in such a way to correspond to each infrared camera 120.

The infrared camera 120 may be movable so as to be able to change the image pickup range. For example, the infrared camera 120 may be capable of panning, zooming, or tilting. In such a case, the mirror for camera system 100 includes an opening region 105 corresponding to a varying image pickup range of the infrared camera 120.

The light source block 130 is a circuit board including the light emitting unit 131. The light source block 130 is mounted with the light emitting unit 131 and is configured such that light emitted by the light emitting unit 131 irradiates the mirror for camera system 100.

The light emitting unit 131 is an LED that emits excitation light. As described above, the wavelength of the excitation light emitted by the light emitting unit 131 is preferably in the 400 nm band. The light emitting unit 131 is provided in the vicinity of the infrared camera 120 and irradiates the fluorescent layer 103 of the mirror for camera system 100. Due to such a configuration, the camera system 10 can suitably pick up an image of an object that reflects fluorescent light caused by the excitation light.

Figure 4:
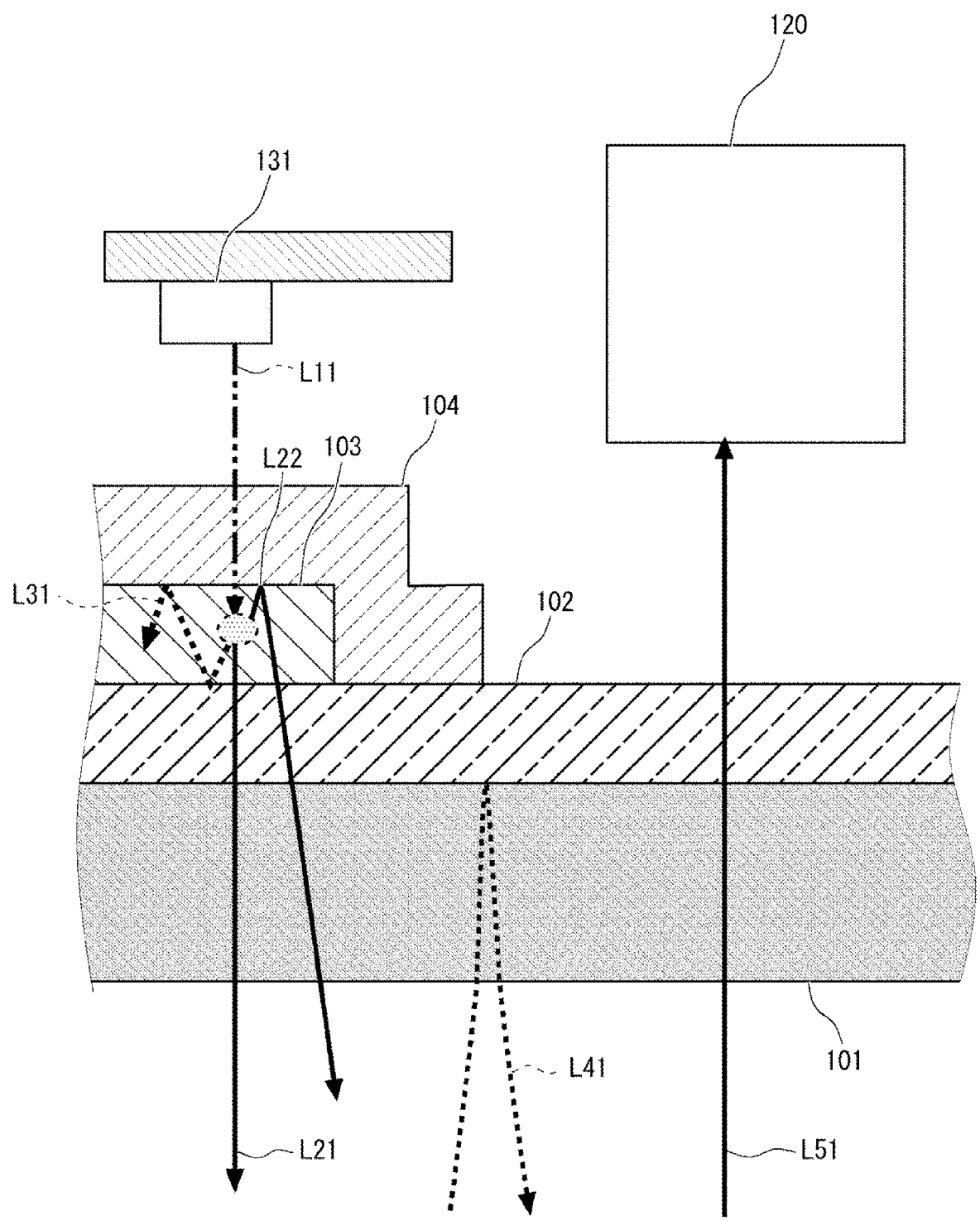
FIG. 4 is a sectional diagram to show the state of light rays in the camera system.

Next, referring to FIG. 4, the state of light rays in the camera system 10 will be described. FIG. 4 is a sectional diagram to show the state of light rays in the camera system 10. FIG. 4 shows first excitation light L11, first fluorescent light L21, second fluorescent light L22, third fluorescent light L31, visible light L41, and return light L51.

The first excitation light L11 having a wavelength in the 440 nm band is emitted from the light emitting unit 131, and passes through the excitation window layer 104 to reach the fluorescent layer 103. In the fluorescent layer 103, the first excitation light L11 is absorbed by a fluorescent body. Upon receiving the first excitation light L11, the fluorescent body releases the first fluorescent light L21, the second fluorescent light L22 and the third fluorescent light L31.

The first fluorescent light L21 is infrared light having a wavelength in the 940 nm band. Upon being released from the fluorescent layer 103, the first fluorescent light L21 passes through the mirror layer 102 and the substrate 101 to be radiated to the outside of the camera system 10. Based on such principle, the camera system 10 converts the excitation light into infrared light, and radiates the converted infrared light into the image pickup range of the infrared camera 120.

The second fluorescent light L22 is infrared light having a wavelength in the 940 nm band, as the same as the first fluorescent light. Upon being released from the fluorescent body of the fluorescent layer 103, the second fluorescent light L22 progresses toward the excitation window layer 104. The excitation window layer 104 has a property of reflecting infrared light. For that reason, upon reaching the excitation window layer 104, the second fluorescent light L22 is reflected at a boundary surface between the fluorescent layer 103 and the excitation window layer 104. The reflected second fluorescent light L22 changes direction and passes through the mirror layer 102 and the substrate 101 to be radiated to the outside of the camera system 10. In this way, as a result of the second fluorescent light L22 released toward the excitation window layer 104 being reflected by the excitation window layer 104 to be radiated to the outside of the camera system 10, the camera system 10 can increase the amount of infrared light as illumination light.

The third fluorescent light L31 is visible light emitted from the fluorescent body. When the third fluorescent light L31 is released from the fluorescent body and reaches the mirror layer 102, it is reflected by the mirror layer 102 which reflects visible light. For that reason, the third fluorescent light L31 changes direction and progresses toward the excitation window layer 104. Then, upon reaching the excitation window layer 104, the third fluorescent light L31 is reflected by the excitation window layer 104.

The visible light L41 reaches the mirror for camera system 100 from the outside of the camera system 10. Upon passing through the substrate 101 and reaching the mirror layer 102, the visible light L41 is reflected by the mirror layer 102. For that reason, the visible light L41 will not affect the inside of the camera system 10. Moreover, due to the visible light L41 being reflected, the camera system 10 can function as an inner mirror. Note that the mirror for camera system 100 can realize a suitable anti-glare function by setting the visible light transmissivity of the substrate 101 to a predetermined property.

The return light L51 is infrared light in the 940 nm band, and is return light that has returned by being reflected back from any object after being released from the fluorescent layer 103 to the outside of the camera system 10. The return light L51 passes through the substrate 101 and the mirror layer 102, and reaches the infrared camera 120. Due to the return light reaching the camera system 10 in this way, the camera system 10 can pick up an image in the interior of the automobile 90.

Although embodiments have been described so far, the mirror for camera system 100 or the camera system 10 according to the embodiments will not be limited to the above-described configurations. For example, the infrared camera 120 may include a band-pass filter that transmits the 940 nm band alone.

Moreover, although the camera system 10 according to the present embodiment has been described as one for picking up an image of the interior of an automobile, this is not limiting. The camera system 10 may be used for various moving bodies such as ships, aircraft, rockets, spacecraft, and submarines. Moreover, the mirror for camera system 100 according to the present embodiment may be used for, for example, monitoring cameras which are provided at predetermined positions.

By the way, it is general that an infrared camera is provided with a band-pass filter which transmits the 940 nm band alone. But, when an LED is used as the illumination light of the infrared camera, the following problem arises. That is, the peak of the wavelength of light emitted from an LED changes as the environmental temperature changes. Specifically, for example, the temperature of the interior of an automobile varies from minus 40 degrees Celsius to plus 80 degrees Celsius depending on the weather etc. Under such circumstances, the peak wavelength of an LED can vary by about 50 nm. In this case, in a low temperature environment or a high temperature environment, infrared light, which is illumination light, deviates greatly from the 940 nm band. Therefore, images picked up by the infrared camera may lack brightness.

On the other hand, if the transmission bandwidth of the band-pass filter is extended so as not to suffer from insufficient brightness, the infrared camera will excessively capture sunlight in the extended band. In this case, images picked up by the infrared camera have poor contrast.

The wavelength of light emitted by the rare earth element included in the fluorescent layer 103 used in the embodiments is less susceptible to temperature changes. Therefore, the camera system 10 does not need to expand the transmission bandwidth of the band-pass filter to be provided in the infrared camera 120. Therefore, the camera system 10 can suppress the effect of sunlight by adopting the mirror for camera system 100. Further, as described above, the fluorescent layer 103 exhibits less changes in wavelength due to changes in environmental temperature. Therefore, the infrared camera 120 can suppress degradation in image quality due to changes in environmental temperature.

As described above, according to the embodiment, it is possible to provide a mirror for camera system and a camera system, which suppress variations in image quality.

It should be noted that the present invention is not limited to the above-described embodiments, and can be modified as appropriate within a range not departing from the spirit of the invention.

What is claimed is:

1. A mirror for camera system, comprising:
    a substrate provided at a position opposed to an infrared camera, the substrate being configured to transmit visible light and infrared light;
    a mirror layer provided on a main surface side of the substrate, which is a side opposed to the infrared camera, the mirror layer being configured to reflect visible light and transmit infrared light;
    a fluorescent layer provided at least in a part of a surface of the mirror layer, the fluorescent layer being configured to emit at least infrared light as a result of receiving predetermined excitation light; and
    an excitation window layer provided so as to cover the fluorescent layer, the excitation window layer being configured to transmit the excitation light and reflect at least the infrared light.

2. The mirror for camera system according to claim 1, wherein the fluorescent layer and the excitation window layer have an opening region in a range corresponding to an image pickup range of the infrared camera.

3. The mirror for camera system according to claim 1, wherein the fluorescent layer contains a rare earth element as a fluorescent body that emits fluorescent light upon receiving the excitation light.

4. A camera system, comprising:
    the infrared camera;
    a light emitting unit configured to emit the excitation light; and
    an enclosure having an opening portion and a recessed portion, the enclosure being configured to accommodate the infrared camera and the light emitting unit in the recessed portion, and to fit with the mirror for camera system according to claim 1 at the opening portion.

5. The camera system according to claim 4, wherein the camera system is provided in an interior of a moving body;
    the light emitting unit illuminates the interior; and
    the infrared camera picks up an image of the interior.

* * * * *